June 15, 1937. T. R. PADGETT 2,083,861
SEPARATOR FOR WATER AND GASOLINE
Filed Nov. 5, 1935
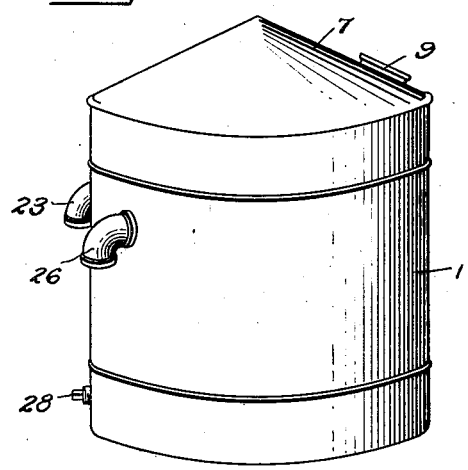
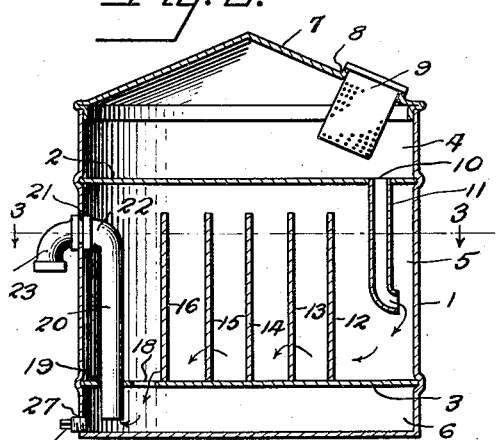
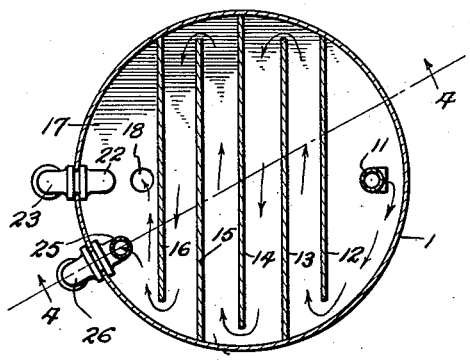
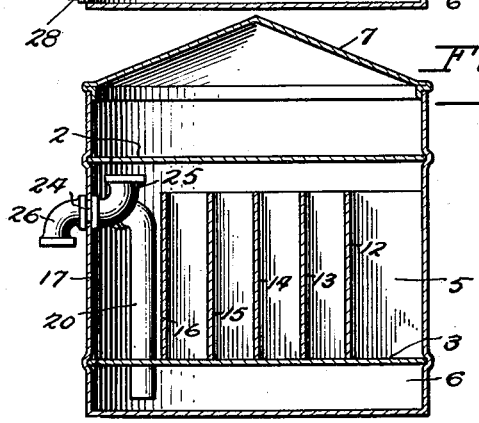
Inventor
Thomas R. Padgett
By Herbert L. Davis
Attorney Patented June 15, 1937

2,083,861

UNITED STATES PATENT OFFICE 2,083,861

SEPARATOR FOR WATER AND GASOLINE

Thomas Ransom Padgett, Gaffney, S. C.

Application November 5, 1935, Serial No. 48,390

2 Claims. (Cl. 210—60)

This invention relates to fluid separators particularly designed for use in cleaning establishments for the purpose of separating cleaner's solvent or gasoline from water in the liquids discharged from extracting machine used for extracting both dry cleaned and wet cleaned garments.

The main object of the invention is to provide a device of the character described which can be manufactured in large quantities and sold very cheaply.

Another object of the invention is to provide a device of the character described which performs its function of separating the cleaning solvent or gasoline from water without attention on the part of an operator and without the use of moving parts.

Other objects of the invention will become apparent as the detailed description thereof proceeds.

In the drawing:—

Figure 1 is a perspective view of a preferred embodiment of the invention;

Figure 2 is a central vertical section through the device shown in Figure 1;

Figure 3 is a horizontal section taken on the line 3—3 of Figure 2; and

Figure 4 is a vertical section taken on the line 4—4 of Figure 3.

As shown in the drawing, the device comprises a casing 1, divided by horizontal partitions 2 and 3 into a dumping chamber 4, an intermediate or settling chamber 5, and a lower chamber 6. The partitions 2 and 3 are secured in any suitable way in the casing 1, as by crimping the casing to form recesses supporting the aforesaid partitions.

The dumping chamber 4 is closed by a conical cover 7, one wall of which is provided with an opening 8 in which is seated a filter screen 9 adapted to receive the liquids to be separated during its passage into the dumping chamber 4. The partition 2 is provided with an aperture 10 from which depends a pipe 11, having its discharge outlet substantially at the middle of the settling chamber 5 between the partitions 2 and 3.

A series of baffle plates 12, 13, 14, 15 and 16 are arranged in the settling chamber 5, with their lower edges secured to the partition 3. The upper ends of the baffle plates terminate at about the same level in the chamber 5 at a short distance below the partition 2. The baffle plates are secured in alternation to diametrically opposite sides of the casing 1, so as to force the liquid to be separated to move through a tortuous path toward the discharge chamber 17 formed between the last baffle plate 16 and the wall of the casing.

The partition 3 in the chamber 17 is provided with an aperture 18 through which the heavier liquid of the liquid mixture settles into the lower chamber 6. A second aperture 19 is formed in the partition 3 to receive a discharge pipe 20 which extends upwardly from the chamber 6 to a discharge outlet 21 formed in the side of the casing 1 and receiving an elbow 22 formed at the top of the pipe 20. A discharge elbow 23 is connected to the elbow 22 through the aperture 21 and serves to direct the heavier separated liquid to any suitable container.

It will be obvious from inspections of Figures 2 and 4 of the drawing that in order to cause discharge of the heavier separated liquid through the pipe 20, it will be necessary to provide a head somewhat higher than the discharge outlet 21, because the solvent or gasoline must be lighter than the heavier liquid such as water. This additional head is provided in the settling chamber by having a discharge outlet 24 formed in the casing 1 and by connecting through this discharge outlet 24 a pair of elbows 25 and 26. The elbow 25 is turned upwardly in the settling chamber so that its inlet end is definitely higher than the outlet end of the pipe 20. Obviously, it must be at such height as to ensure a flow of water from the lower chamber 6 through the pipe 20 when the liquid in the chamber 5 exceeds the level of the upper end of the elbow 25.

It will be apparent from the drawing that when the liquid to be cleaned or separated is dumped into the chamber 4 it will flow through the pipe 11 into the settling chamber 5. The liquid in the chamber 5 then flows around the baffle plates toward the chamber 17, the heavier liquid flowing through the aperture 18 into the lower chamber 6. As the liquid rises in the settling chamber 5 the cleaning solvent or gasoline naturally floats on the top of the heavier liquid until it rises over the top of the elbow 25. The hydrostatic head produced by this rise of liquid in the chamber 5 causes the water from the chamber 6 to flow through the discharge pipe 20. At the same time, the lighter liquid rising above the top of the elbow 25 flows out through the discharge outlet 26.

It will be apparent that the operation of the device is wholly automatic and requires no attention on the part of the operator, other than that of filling the upper chamber with the liquid mixture to be cleaned. The sediment which might pass through the filter screen 9 would be trapped in the lower chamber 6; and this would be removed through a drain outlet 27, which is ordinarily closed by a screwthreaded plug 28.

What I claim is:—

1. A liquid separator comprising a container divided by upper and lower horizontal partitions into upper, lower and intermediate chambers; a pipe near one side of the casing for conducting liquid to be separated from the upper chamber into the intermediate chamber; a series of vertical baffle plates supported by the lower partition and staggered in alternation horizontally in the intermediate chamber to force the liquid through a tortuous path from the said side toward the opposite side, the lower partition being provided near said opposite side with an aperture for conducting the heavier liquid to the lower chamber; a pipe extending upwardly from the lower chamber to a discharge outlet at slightly below the level of the top edges of said baffle plates; and an over-flow outlet from the intermediate chamber having its upper edge at such height above the said discharge outlet as to provide a hydrostatic head sufficient to cause flow of the heavier liquid through the lower chamber to the discharge pipe when the liquid level in the intermediate chamber is higher than said upper edge.

2. A liquid separator comprising a container divided by upper and lower horizontal partitions into upper, lower and intermediate chambers: a pipe near one side of the casing for conducting liquid to be separated from the upper chamber into the intermediate chamber, a series of vertical baffle plates extending upwardly from the lower partition and staggered in alternation horizontally in the intermediate chamber to force the liquid through a tortuous path from the said side toward the opposite side, the lower partition being provided with an aperture for conducting the heavier liquid to the lower chamber; a pipe extending upwardly from the lower chamber to a discharge outlet at slightly below the level of the tops of said baffle plates, and an overflow outlet from the intermediate chamber having its upper edge at such height above the said discharge outlet as to provide a hydrostatic head sufficient to cause flow of the heavier liquid through the lower chamber to the discharge pipe when the liquid level in the intermediate chamber is higher than said upper edge.

THOMAS RANSOM PADGETT.